United States Patent
Abels et al.

(10) Patent No.: US 11,445,700 B2
(45) Date of Patent: Sep. 20, 2022

(54) DEVICE, SYSTEM AND METHODS FOR TRACKING ANIMALS

(71) Applicant: MAX-PLANCK-GESELLSCHAFT ZUR FOERDERUNG DER WISSENSCHAFTEN E.V., Munich (DE)

(72) Inventors: Markus Abels, Inning (DE); Manfred Gahr, Munich (DE); Robin Van Emden, The Hague (NL)

(73) Assignee: MAX-PLANCK-GESELLSCHAFT ZUR FOERDERUNG DER WISSENSCHAFTEN E.V., Munich (DE)

( * ) Notice: Subject to any disclaimer, the term of this patent is extended or adjusted under 35 U.S.C. 154(b) by 0 days.

(21) Appl. No.: 16/975,783

(22) PCT Filed: Mar. 1, 2019

(86) PCT No.: PCT/EP2019/055190
§ 371 (c)(1),
(2) Date: Aug. 26, 2020

(87) PCT Pub. No.: WO2019/166646
PCT Pub. Date: Sep. 6, 2019

(65) Prior Publication Data
US 2020/0404883 A1      Dec. 31, 2020

(30) Foreign Application Priority Data
Mar. 2, 2018   (EP) ..................... 18159827

(51) Int. Cl.
*A01K 11/00*     (2006.01)
*H04W 4/029*    (2018.01)
(Continued)

(52) U.S. Cl.
CPC .......... *A01K 11/006* (2013.01); *A01K 29/005* (2013.01); *G01S 5/0027* (2013.01);
(Continued)

(58) Field of Classification Search
CPC .. A01K 11/006; A01K 29/005; A01K 11/008; H04W 4/029; H04W 4/80;
(Continued)

(56) References Cited

U.S. PATENT DOCUMENTS 6,067,018 A * 5/2000 Skelton ................ A01K 27/009
                                                                      119/908
7,502,619 B1    3/2009 Katz
(Continued)

OTHER PUBLICATIONS

International Search Report dated May 14, 2019 for corresponding International Application No. PCT/EP2019/055190.

*Primary Examiner* — James J Yang
(74) *Attorney, Agent, or Firm* — Tarolli, Sundheim, Covell & Tummino LLP

(57) ABSTRACT

Disclosed are a device, system and method for animal tracking. The tracking device comprises a tracker processing component, an energy component, a transmitting component, and a securing component. The system comprises the tracking device, a receiving device and a server. The method comprising securing the tracking device to an animal, transmitting an identification of the animal, receiving the transmission via the receiving device, modifying it and forwarding it to the server, where the modified transmission is logged and analyzed to determine animal positions.

18 Claims, 7 Drawing Sheets

(51) Int. Cl.
*H04W 4/80* (2018.01)
*A01K 29/00* (2006.01)
*G01S 5/00* (2006.01)
*G01S 13/46* (2006.01)

(52) U.S. Cl.
CPC ............ *G01S 13/46* (2013.01); *H04W 4/029* (2018.02); *H04W 4/80* (2018.02); *G01S 2013/468* (2013.01)

(58) Field of Classification Search
CPC ...... H04W 84/10; G01S 5/0027; G01S 13/46; G01S 2013/468; G01S 5/00
See application file for complete search history.

(56) References Cited

U.S. PATENT DOCUMENTS

| | | |
|---|---|---|
| 8,188,869 B2 | 5/2012 | Wangrud |
| 9,442,178 B2* | 9/2016 | Eruchimovitch ......... G01S 5/02 |
| 10,132,931 B2* | 11/2018 | MacCurdy ............ G01S 5/0027 |
| 2008/0001815 A1* | 1/2008 | Wang ................... A01K 11/008 342/357.46 |
| 2015/0351369 A1 | 12/2015 | Frazier |
| 2016/0105762 A1* | 4/2016 | Singh ...................... H04W 4/80 455/41.2 |
| 2016/0366858 A1 | 12/2016 | Seltzer |

\* cited by examiner

DEVICE, SYSTEM AND METHODS FOR TRACKING ANIMALS

RELATED APPLICATIONS

The present application is a U.S. National Stage application under 35 USC 371 of PCT Application Serial No. PCT/EP2019/055190, filed on 1 Mar. 2019, which claims the benefit of EP Application No. 18159827.7, filed on 2 Mar. 2018.

FIELD

The invention is directed towards tracking animals, particularly outdoors. The invention is further directed towards a small animal tracking device. The invention is also directed towards a method for animal tracking comprising using the tracking device and a plurality of receiving devices to obtain information related to the tracked animal's location.

INTRODUCTION

Tracking of animal movements has been the subject of a lot of research, as well as some commercial developments. In research, tracking of various animals helps understand their migration patterns, behaviors, adaptive mechanisms and other habits. In industry, tracking grazing livestock is often desired. For private individuals tracking of pets venturing outdoors is also attractive.

Many devices for animal tracking are known in the art already. For example, U.S. Pat. No. 8,188,869 B2 discloses a kit for monitoring and tracking the location of at least one animal. The kit includes a GPS implant designed to be transplanted subcutaneously into an animal, and capable of communicating spatial information related to the location of the animal.

GPS-based animal trackers are often bulky and should be worn, for example, on a collar. Those are generally suited for larger animals such as cattle. Such devices can also be fairly expensive and energy-consuming to manufacture.

Furthermore, trackers using other communication methods than GPS are also known. For instance, U.S. Pat. No. 7,502,619 B1 discloses a method and system for location determination of low power wireless devices, over a wide area, utilizing a multitude of communication devices operating on a WAN (Wide Area Network) which can detect signals transmitted by said nearby low power wireless devices, and report this detection to a control station over the WAN. The devices can be used for, among other things, animal tracking.

Such devices can require significantly less energy to operate due to their passive transmitting. However, no sufficiently lightweight and inexpensive devices are known in the art that can be used with even the smallest animals such as birds or rodents. Furthermore, disclosed tracking devices generally need an energy source such as a battery to allow them to function.

SUMMARY

In light of the above, it is the object of the present invention to disclose an improved and/or alternative animal tracking device and tracking method.

It is also a preferred advantage of the present invention to disclose an animal tracking device that is lightweight and low cost. It is another preferred advantage of the present invention to disclose a tracking device configured for short-range transmissions. It is also a preferred advantage of the present invention to disclose a device that does not burden the animal. Furthermore, it is a preferred advantage of the present invention to provide a system and method for animal tracking that comprises a plurality of tracking devices and a plurality of receivers along with a server. It is also a preferred advantage of the present invention to disclose a system and method that generate an animal map based on the data from the animal tracking devices.

In a first embodiment, a tracking device for animals is disclosed. The device comprises a tracker processing component, an energy component, a transmitting component and a securing component. The transmitting component is configured to periodically transmit a transmission comprising at least an identification corresponding to the animal and is configured for short-range transmissions. The securing component is configured to secure the device to animals.

The tracking device allows for a simple and resource-efficient way of monitoring different types of animals. The present device is much lighter and smaller than similar known devices. The preferred weight of the device is less than 0.5 grams. This allows it to be used with very small animals such as birds. The processing component of the device can coordinate its functioning and can comprise a microcontroller chip for example. The energy component can provide energy for the functioning of the device.

Note, that short-range transmissions refer herein to transmissions with a maximum range of a few dozen kilometers. Preferably, the maximum transmission range is about 10 kilometers. Transmissions in this range are particularly useful for the present device, since the range is large enough to be useful (that is, the signal will likely often be picked up by devices in range), but not too large to require a larger amplifier and/or different frequency of transmissions.

Also note, that "periodical" transmissions refer herein to repeated transmissions with a certain (not necessarily constant) time delay. That is, the tracking device can transmit anywhere between once per second and once per a few minutes. Preferably, the transmissions are sent about once per second provided sufficient energy is available via the energy component.

Transmission refers herein to an electromagnetic signal, preferably in the radio wave range.

In some embodiments, the tracking device can comprise a maximum weight of the lowest between at most about 5% of the weight of the animal it is configured to track and 5 grams. This allows the device to be comfortably secured to an animal without burdening it with excessive weight. For example, small birds can weigh about 20-50 grams. To ensure that they are not excessively burdened by the tracking device, its weight should be less than about 1 gram. This is easily achieved by the present tracking device, which can weigh about 0.5 grams and can be further reduced to about 0.3 grams. For larger animals, the device can also weigh more without burdening them. That is, in some embodiments, the weight of the tracking device can at most 2 g, preferably at most 1 g, more preferably at most 0.5 g more preferably at most 0.3 g, and even more preferably at most 0.1 g, excluding the securing component.

Such light weights ensure the minimum burden to the animals being tracked and nevertheless providing a reliable tracking device.

In some embodiments, the transmitting component can be configured to transmit via a Bluetooth® protocol. That is, processing component can be configured to prepare a transmission conforming with the Bluetooth® protocol and the transmitting component can broadcast it at the typical Bluetooth® protocol frequencies. In some preferred embodiments, the transmitting component can be configured to operate via a Bluetooth® low energy protocol (also referred to as BLE protocol or just BLE herein). In some such embodiments, the tracking device can be configured to use only an advertising part of the BLE protocol. That is, only the first, broadcasting part of the protocol can be used. In this way, no connection (that is, two-way communication) would be needed between the tracking device and the receiving device, and energy usage can be optimized.

Using Bluetooth® or a similar communication protocol can allow for "passive" tracking of animals, which results in minimizing energy expenditures needed for the tracking device. The tracking is referred to as "passive" because it generally relies on a third-party device for forwarding the tracker's transmission. That is, the transmission is periodically sent by the tracking device, and picked up by all devices configured for Bluetooth® protocol communication, provided they are in range of the transmission. Such devices can generally comprise mobile phones, smartphones, tablets, laptops, wearable devices and/or other personal computing devices. Such devices are referred to as "receiving devices" in the present application. The receiving devices forward the transmission along with additional information to a central server which collects this data and further processes it.

This communication scheme allows to manufacture the tracking device with less components and smaller than in the case where it would directly communicate with the central server.

A different communication protocol other than Bluetooth® can also be used. For example, Z-Wave can also be used for future applications. The criteria for using a given protocol can comprise its widespread use in personal computing devices. Here, Bluetooth® is currently preferred due to its widespread use in smartphones, tablets and similar mobile devices. That is, preferably a protocol that is commonly preinstalled on mobile devices is used by the tracking device.

In some embodiments, the transmitting component can comprise an antenna. In some such embodiments, the transmitting component can further comprise a transmission amplifier configured to increase transmission range. As also explained in the description to FIG. 8, the transmission amplifier can be particularly useful for bringing the transmission range from about a few tens of meters up to a kilometer (with the current BLE 4.2 protocol version). With the above and below described configuration the present tracking device is particularly also suited for use with any future BLE protocol, such as particularly the BLE 5.2 protocol.

In some embodiments, the energy component can comprise a solar cell. In some other embodiments, the energy component can comprise at least one photodiode, preferably two photodiodes, and one or more pin photodiode(s). The photodiode can be particularly customized according to the use and/or animal it is intended to be attached to. That is, generally, solar energy can be used as a main (or sole) energy source. This can be useful, as small, reliable and efficient solar energy components are available. Furthermore, solar energy is widely available outdoors, where animal tracking would mostly occur. The tracking device can also function without direct sunlight, for example during cloudy weather.

In some other embodiments, the energy component can comprise a kinetic energy power cell and/or at least a thermal energy power cell. Using kinetic and/or thermal energy can be very useful, as the device is generally secured to a living animal, which would provide either and/or both of those energy types by moving and producing body heat.

In some embodiments, the energy component can further comprise an energy storage component. The energy storage component can comprise a battery, particularly for trackers that are to be used with larger animals, where the tracker's weight is less critical and can be increased by an addition of a battery. In some such embodiments, the energy storage component can comprise a capacitor. The capacitor can serve as a lighter alternative to a battery. While constant power would be harder to achieve with a capacitor (for example, in the absence of light), it provides a significant advantage as regards the weight of the tracking device. In some such embodiments, the capacitor can comprise a capacitance of up to 500 μF, preferably up to 200 μF, such as about 100 μF or less.

In some embodiments, the securing device can be configured to release after at least a certain predetermined time in use, so that the tracking device is no longer secured to the animal. This can be achieved, for example, by securing the securing device with a certain type of glue that slowly disintegrates. This is particularly useful for tracking wild animals, as pet and cattle owners can simply remove the devices after the end of their lifetime and/or when they are no longer necessary. For some types of animals, the securing device can comprise a "backpack" that can be secured to an animal's back via straps (with the tracking device serving as a body of the backpack). The straps can be connected with a slowly disintegrating glue or the like. For other types of animals, a collar with the tracking device would be more suitable. Other types of securing devices would also be possible.

In some embodiments, the tracking device can further comprise at least one sensor. The tracker processing component can be configured to add data collected by the sensor to the transmission. The sensor can comprise at least one of a temperature sensor, a humidity sensor and an accelerometer. The sensors can be used to monitor the physiological state of the tracked animal and/or of its surroundings. For example, the temperature and acceleration sensors can indicate whether the animal is alive and healthy.

In some embodiments, the tracking device can be configured to output the transmission with a power output of between 500 μW and 100 mW. The precise power of the transmission can be programmed in advance and can be different depending on the precise application of the animal tracker. Preferably, the higher end of the power output is used, since it allows further reach for the transmission. That is, about 1 km range can be reached with the 100 mW transmission.

In some embodiments, the tracker processing component can be configured to adjust rate of transmitting the transmission based on energy input to the energy component. That is, when more energy is available, the transmission can be sent with a smaller time delay, such as about a second. When less energy is available, the transmission can be sent with a larger time delay, such as up to a few minutes.

In some embodiments, the processing component can be configured to decrease the rate of sending the transmission to at most 1 per 40 seconds when the energy input of the energy component comprises at most 4000 lux. The processing component can also be configured to increase the rate of sending the transmission to at least 1 per second, preferably at least 1 per 10 ms when the energy input of the energy component comprises at least 30 000 lux.

Note, that if energy input of the energy component falls below a certain minimum required for the processing component to function, the transmission would naturally stop altogether. However, it is advantageous to adapt to the changing energy availability while enough energy input is available to the energy component, since transmitting with a lower rate is more optimal than stopping transmission entirely. The processing component can be configured to adjust the rate of sending the transmission proportionally when the energy input of the energy component is between 4000 and 30 000 lux.

The tracking device (1) particularly comprises a system on a chip (SoCs) comprising at least two of the following components: the tracker processing component (2); and the energy component (4); and the transmitting component (6). It can particularly comprise all three components on one chip, making the device even more light weighted and more reliable.

In a second embodiment, a system for tracking animals is disclosed. The system comprises a plurality of tracking devices, particularly any devices as described and specified above and below. Each of the trackers comprises a tracker processing component, an energy component, a transmitting component and a securing component. The transmitting component is configured to periodically transmit a transmission comprising at least an identification corresponding to the animal and is configured for short-range transmissions. The securing component is configured to secure the device to animals. The tracker can be as described in any of the embodiments above.

The system further comprises a plurality of receiving devices. Each receiving device comprises a receiver processing component, a receiving communication component configured to detect transmissions from the tracking device when in range, and a receiver server communication component.

The system further comprises a server configured to log and analyze animal positions based on the communications from the receiving devices.

The receiver processing component is configured to add further data to the transmission to obtain a modified transmission The receiver server communication component is configured to communicate the modified transmission to the server.

That is, the receiver comprises two communication components: one for receiving the transmission from the tracker, and one for communicating with a server. Note, that the two can comprise the same physical component configured to communicate via different protocols. However, different protocols are used for communication between the tracker and the receiving device and the receiving device and the server. This is because the communication between the receiving device and the server is generally a longer distance communication. It can be done via standard LTE protocols or the like. It also generally requires a larger energy expenditure than the communication between the tracker and the receiving device (note, that the communication between the tracker and the receiving device is also one sided, as the tracker does not receive any communication from the receiving device).

In some embodiments, the server can be configured to generate a map of animals corresponding to the tracking devices. Note, that this can be only one output of the server analyzing the data from the trackers and the receiving devices. Further outputs can include a text-based list of locations of one or more animals, an extrapolation or interpolation of the location, an alert when a specific animal is located in a certain area and/or outside of a certain area and further outputs. The map can be particularly interesting as an output that can be accessed by users of receiving devices. For example, bird watchers may be interested in seeing which birds are located in their vicinity.

In some embodiments, the receiver processing component can be configured to add data associated with the receiving device to the transmission. In some such embodiments, the data associated with the receiving device can comprise at least location of the receiving device. For example, GPS coordinates of the receiving device can be appended to the transmission. Further data such as time, weather and further parameters can also be added. In this way, the tracking device need only transmit the bare minimum information (that is, only an identification of the tracker allowing for identification of the animal, such as an ID number), and the bulk of data can be added by the receiving device. This is advantageous, since the energy usage of the tracker can be minimized, and the additional energy usage of the receiver device is generally acceptable.

In some such embodiments, the server can be configured to combine each location received from each receiving device for each tracking device to obtain a time-dependent position corresponding to the animal to which each tracking device is secured.

In some such embodiments, the server can be further configured to create a time-dependent location map for each tracking device.

In some such embodiments, the server can be further configured to communicate at least one of the location map and the time-dependent location map to the receiving device.

In some embodiments, the server can be configured to send the map of animals to each receiving device. As mentioned above, it can be interesting for users of the receiving devices to the animals' position. In the case of wild animal tracking, all of the available data on all animals can be publicly accessible. In the case of pet or cattle tracking or finding, some data may also be restricted to specific users. Besides the generated map, the server can also share other types of data with the receiving devices. For example, a text-based list of one or more animal locations, further information regarding a specific animal (such as pictures, habits and other data), alerts or notifications regarding an animal in the vicinity and so on.

In some embodiments, the receiving device can be configured to receive transmissions from the tracking device in a range of at least 100 m, more preferably at least 500 m, even more preferably at least 1000 m and at most 10000 m. Precise range of receiving can also be determined by the type of the receiving device and by the receiving communication component.

In some embodiments, the server can be further configured to triangulate location of the tracking device when receiving a plurality of modified transmissions from a plurality of distinct receiving devices identifying the same tracking device. That is, a more precise location of the tracking device and the corresponding animal can be determined. The server can also communicate the result of the triangulation to the receiving devices. This server module can be used for many purposes. For example, owners looking for lost pets can go out with a few friends and narrow down the location of the pet by using the triangulation. Additionally or alternatively, animal watchers can also more effectively track animals in the wild. Similarly, cattle owners can locate their animals. The triangulation module can be running automatically, or it can be triggered by a user (that is, requested via the receiving device) and executed by the server upon request.

In some embodiments, the server can be further configured to send a map with all nearby tracking devices to the receiving device. As mentioned above, this can be interesting for various reasons, particularly for animal tracking in the wild, such as bird watching.

In some embodiments, the server can be further configured to provide further information associated with a particular tracking device to the receiving device upon request. This information can comprise photos of the animal associated with the tracking device, the animal's habits, the history of the animal's location and further data.

In some embodiments, the server can be configured to interpolate a path taken over a time interval by a specific tracking device secured to an animal based on the modified transmissions received from a plurality of the receiving devices. In some such embodiments, the server can be further configured to interpolate the path over the time interval based on known parameters of the animal associated with the tracking device. For example, when an animal is known to have a "home" such as a burrow, a nest or similar, the server can interpolate that the animal stays there overnight or during the day. Additionally or alternatively spots where the animal is frequently spotted can be used for interpolation as well.

In some embodiments, the server can be configured to extrapolate a path taken over a time interval by a specific tracking device secured to an animal based on the modified transmissions received from a plurality of the receiving devices. In some such embodiments, the server can be further configured to extrapolate the path over the time interval based on known parameters of the animal associated with the tracking device. As above, if an animal often spends a certain time period in one place, it can be reasonable to assume that it would come there during this certain time period and thereby an extrapolation can be performed.

In some embodiments, analyzing animal positions by the server can comprise at least one of tracking animals over time, determining animal state based on recent movements, determining animal habits, interpolating animal location based on available data, and extrapolating animal movements based on available data. All of these server analysis modules or subprocesses can be generally useful for users of the receiving devices and/or for the general purposes of research, for example by scientists tracking animals.

In some embodiments, each tracking device can be assigned an access level and the server can be configured to grant each receiving device access to data associated with a given tracking device only if the receiving device is authorized for the access level of the given tracking device. This can be particularly useful for tracking pets and/or cattle. Owners of such animals may not want public access granted to the location of their animals. Therefore, some animal data may be accessible only to owners or to persons authorized by owners. Conversely, wild animal data can be publically accessible for all interested parties.

In some embodiments, the system can further comprise a first set of tracking devices associated with a first type of animal and a second set of tracking devices associated with a second type of animal. Each receiving device can be configured to detect transmissions from both the first set of tracking devices and the second type of tracking devices and communicate the modified transmissions to the server. The server can be configured to process the modified transmissions and assign data associated with the first and second sets of tracking devices to separate submodules and log and analyze positions of the two type of animals separately. In some such embodiments, the first and second sets of animals can comprise at least one of wild animals, cattle and pets. That is, the server can simultaneously process data from multiple types of animals associated with different sets of trackers. Therefore, the same infrastructure can be used to simultaneously track wild animals such as birds, farm cattle and outdoor pets such as cats. This can make it particularly attractive for owners of the receiving devices to participate in the system (typically by installing a certain program or application on their receiving device), as with more types of tracking available, one or more may be particularly interesting for different users. The server can have different databases storing data associated with different sets of tracking devices. Furthermore, different output or analysis can be performed on the data associated with different sets. For example, owners of pets may receive a notification when their pet is nearby and/or when it ventures outside a certain preset zone. Bird watchers, on the other hand, may open the application on their receiving device to see a map of nearby tracked birds. Cattle owners can track their animals by driving around the property and receiving an updating map of the cattle locations.

In a third embodiment, a method for tracking animals is disclosed. The method comprises securing a tracking device comprising a tracker processing component, an energy component, a transmitting component, and a securing component to an animal. The method further comprises the tracking device periodically transmitting a transmission comprising at least an identification corresponding to the animal via the transmitting component. The method also comprises a receiving device comprising a receiver processing component, a receiving communication component and a receiver server communication component receiving the transmission from the tracking device when the receiving device is in range of the tracking device's transmission. The method also comprises the receiving device modifying the transmission by adding further data to it to obtain a modified transmission. The method further comprises the receiving device using the receiver server communication component to communicate the modified transmission to the server. The method also comprises the server logging and analyzing animal positions based on communications from a plurality of the receiving devices.

The constituents of the system (that is, the tracking device, the receiving device and the server) can be as described in the preceding embodiment.

In some embodiments, the server can generate a map of animals corresponding to the tracking devices. As described above, the map can be useful for the owners of the receiving devices and/or for the operators of the server for research or other purposes. The server can also generate further and additional outputs based on the data from the tracking and receiving devices.

In some embodiments, the method can further comprise the server communicating further data associated with the particular tracking device to the receiving device and the server providing the generated map of animals to the receiving device.

In some embodiments, the method can further comprise the securing component releasing after at least a certain predetermined time in use, so that the tracking device is no longer secured to the animal. This can be useful to relieve the animal of any burden (however small) associated with the tracking device either after a certain period of time or after the end of the tracking device's typical lifetime.

In some embodiments, the method can further comprise the receiving device adding location data associated with it to the transmission. In some such embodiments, the server can generate a location map of a plurality of tracking devices secured to the animals. In some such embodiments, the method can further comprise the server generating a time-dependent location map of the tracking devices secured to the animals.

In some embodiments, the method can further comprise the server sending a map with all nearby tracking devices to the receiving device.

In some embodiments, the method can further comprise the server receiving a plurality of modified transmissions from a plurality of distinct receiving devices relating to the same tracking device. The method can also further comprise the server triangulating the location of the tracking device based on the plurality of the modified transmissions. Such triangulation can be useful for many purposes as explained above and below with reference to FIG. 9.

In some embodiments, the tracking device can further comprise a sensor. The method can then further comprise the tracking device adding sensor data to the transmission and the server using sensor data to determine status of the animal. The status of the animal can comprise its physiological parameters, health, weather conditions at its location and/or further parameters.

In some embodiments, the method can further comprise the tracker processing component adjusting rate of sending out transmissions based on amount of energy available to the energy component at a given time. As described above, this can be advantageous when little energy is available and the transmissions cannot be sent every second or so.

In some embodiments, the method can further comprise the server interpolating a path taken by the tracking device secured to an animal over a time period based on the modified transmissions and further known parameters associated with the animal.

In some embodiments, the method can further comprise the server extrapolating a path taken by the tracking device secured to an animal over a time period based on the modified transmissions and further known parameters associated with the animal.

In some embodiments, analyzing animal positions by the server comprises at least one of tracking animals over time, determining animal state based on recent movements, determining animal habits, interpolating animal location based on available data, and extrapolating animal movements based on available data. As described above, all of these can be run by separate server subprocesses or modules and the outputs can be shared with receiving devices (where applicable based also on restrictions and access levels associated with each tracking device).

In some embodiments, the method can further comprise assigning an access level to each tracking device, and the server granting each receiving device access to data associated with a given tracking device only if the receiving device is authorized for the access level of the given tracking device. This is very useful for tracking pets and/or cattle, where the respective owners may not want third parties having access to their pets locations, habits, and/or further data.

In some embodiments, the method can further comprise providing a first set of tracking devices associated with a first type of animal and a second set of tracking devices associated with a second type of animal. The method can then comprise each receiving device detecting transmissions from both the first set of tracking devices and the second type of tracking devices and communicating resulting modified transmissions to the server. The method can also comprise the server processing the modified transmissions and assigning data associated with the first and second sets of tracking devices to separate submodules to log and analyze positions of the two type of animals separately.

The present invention also addresses the use of any of the preceding tracking device embodiments, tracking system embodiments and tracking method embodiments for tracking birds, preferably wild birds. This is a particularly useful field of application as low weights and low costs are welcome in view of the amount of devices in the field. Also, the use for tracking pets, preferably cats is in the focus of the present invention as it is light weighted and reliable assist the owners in the tracking of their pets without any considerable burden to the pets.

The present invention is also defined by the following numbered embodiments.

Below is a list of device embodiments. Those will be indicated with a letter "A". Whenever such embodiments are referred to, this will be done by referring to "A" embodiments.

A1. A tracking device (1) for animals, the device comprising
- a tracker processing component (2); and
- an energy component (4); and
- a transmitting component (6) configured to periodically transmit a transmission (62) comprising at least an identification corresponding to the animal; and
- a securing component (8) configured to secure the device to animals;

wherein the transmitting component (6) is configured for short-range transmissions (62).

A2. The tracking device (1) according to the preceding embodiment wherein the maximum weight of the device (1) comprises the lowest between
- at most about 5% of the weight of the animal it is configured to track; and
- 5 grams.

A3. The tracking device (1) according to any of the preceding embodiments wherein the transmitting component (6) is configured to transmit via a Bluetooth® protocol.

A4. The tracking device (1) according to any of the preceding embodiments wherein the transmitting component (6) is configured to operate via a Bluetooth® low energy protocol.

A5. The tracking device (1) according to any of the preceding embodiments wherein the transmitting component (6) comprises an antenna.

A6. The tracking device (1) according to the preceding embodiment wherein the transmitting component (6) further comprises a transmission amplifier (64) configured to increase transmission (62) range.

A7. The tracking device (1) according to any of the preceding embodiments wherein the energy component (4) comprises a solar cell.

A8. The tracking device (1) according to any of the preceding embodiments wherein the energy component (4) comprises a kinetic energy power cell.

A9. The tracking device (1) according to any of the preceding embodiments wherein the energy component (4) comprises at least one photodiode, preferably two photodiodes.

A10. The tracking device (1) according to any of the preceding embodiments wherein the energy component (4) comprises at least a thermal energy power cell.

A11. The tracking device (1) according to any of the four preceding embodiments wherein the energy component (4) further comprises an energy storage component.

A12. The tracking device (1) according to the preceding embodiment wherein the energy storage component comprises a capacitor.

A13. The tracking device (1) according to the preceding embodiment wherein the capacitor comprises a capacitance of up to 500 µF, preferably up to 200 µF, such as about 100 µF or less.

A14. The tracking device (1) according to any of the preceding embodiments wherein the securing device (8) is configured to release after at least a certain predetermined time in use, so that the tracking device (1) is no longer secured to the animal.

A15. The tracking device (1) according to any of the preceding embodiments further comprising at least one sensor (20) and wherein the tracker processing component (2) is configured to add data collected by the sensor (30) to the transmission (62).

A16. The tracking device (1) according to the preceding embodiment wherein the sensor (30) comprises at least one of
a temperature sensor;
a humidity sensor;
an accelerometer.

A17. The tracking device (1) according to any of the preceding embodiments and with the features of embodiment A4 further configured to use only an advertising part of the BLE protocol.

A18. The tracking device (1) according to any of the preceding embodiments configured to output the transmission (62) with a power output of between 500 µW and 100 mW.

A19. The tracking device (1) according to any of the preceding embodiments wherein the tracker processing component (2) is configured to adjust rate of transmitting the transmission (62) based on energy input to the energy component (4).

A20. The tracking device (1) according to the preceding embodiment and with the features of at least one of embodiments A7 and A9, wherein the processing component (2) is configured to
decrease the rate of sending the transmission (62) to at most 1 per 40 seconds when the energy input of the energy component (4) comprises at most 4000 lux; and
increase the rate of sending the transmission (62) to at least 1 per second, preferably at least 1 per 10 ms when the energy input of the energy component (4) comprises at least 30 000 lux; and
adjust the rate of sending the transmission (62) proportionally when the energy input of the energy component (4) is between 4000 and 30 000 lux.

A21. The tracking device (1) according to any of the preceding embodiments comprising a weight of at most 2 g, preferably at most 1 g, more preferably at most 0.5 g, more preferably at most 0.3 g, and even more preferably at most 0.1 g, excluding the securing component.

A22. The tracking device (1) according to any of the preceding embodiments further comprising a system on a chip comprising at least two of the following components:
the tracker processing component (2); and
the energy component (4); and
the transmitting component (6).

A23. The tracking device (1) according to any of the preceding embodiments wherein the transmitting component (6) is configured to transmit the transmission according to the BLE protocol 5.2.

A24. The tracking device (1) according to any of the preceding embodiments wherein the energy component comprises a pin photodiode.

A25. The tracking device (1) according to the preceding embodiment wherein the photodiode is customized according to the animal the tracking device (1) is configured to be secured at.

Below is a list of system embodiments. Those will be indicated with a letter "S". Whenever such embodiments are referred to, this will be done by referring to "S" embodiments.

S0. A system for tracking animals, the system comprising any of the preceding tracking embodiments and
a plurality of receiving devices (100, 110, 112, 114, 116); each comprising
a receiver processing component (102); and
a receiving communication component (104) configured to detect transmissions (62) from the tracking device (1) when in range; and
a receiver server communication component (106);
a server (200) configured to log and analyze animal positions based on the communications from the receiving devices (100, 110, 112, 114, 116);
wherein the receiver processing component (102) is configured to add further data to the transmission (62) to obtain a modified transmission (162); and
wherein the receiver server communication component (106) is configured to communicate the modified transmission (162) to the server (200).

S1. A system for tracking animals, the system comprising
a plurality of tracking devices (1,10,12,14,16,18), each comprising
a tracker processing component (2); and
an energy component (4); and
a transmitting component (6) configured to periodically transmit a transmission (62) comprising at least an identification corresponding to the animal; and
a securing component (8) configured to secure the device to animals;
wherein the transmitting component (6) is configured for short-range transmissions (62);
a plurality of receiving devices (100, 110, 112, 114,116); each comprising
a receiver processing component (102); and
a receiving communication component (104) configured to detect transmissions (62) from the tracking device (1) when in range; and
a receiver server communication component (106);
a server (200) configured to log and analyze animal positions based on the communications from the receiving devices (100, 110, 112, 114, 116);
wherein the receiver processing component (102) is configured to add further data to the transmission (62) to obtain a modified transmission (162); and
wherein the receiver server communication component (106) is configured to communicate the modified transmission (162) to the server (200).

S2. The system according to any of the preceding embodiments wherein the server (200) is configured to generate a map of animals corresponding to the tracking devices (1, 10, 12, 14, 16, 18).

S3. The system according to any of the preceding system embodiments wherein the receiver processing component (102) is configured to add data associated with the receiving device (100) to the transmission (62).

S4. The system according to the preceding embodiment wherein the data associated with the receiving device (100) comprises at least location of the receiving device (100).

S5. The system according to the preceding embodiment wherein the server (200) is configured to combine each location received from each receiving device (100) for each tracking device (1) to obtain a time-dependent position corresponding to the animal to which each tracking device (1) is secured.

S6. The system according to the preceding embodiment wherein the server (200) is further configured to create a time-dependent location map for each tracking device (1).

S7. The system according to any of the two preceding embodiments wherein the server (200) is further configured to communicate at least one of the location map and the time-dependent location map to the receiving device (100).

S8. The system according to any of the preceding system embodiments and with the features of embodiment S2 wherein the server (200) is configured to send the map of animals to each receiving device (100).

S9. The system according to any of the preceding system embodiments wherein the receiving device (100) is configured to receive transmissions (62) from the tracking device (1) in a range of at least 100 m, more preferably at least 500 m, even more preferably at least 1000 m and at most 10000 m.

S10. The system according to any of the preceding system embodiments wherein the server (200) is further configured to triangulate location of the tracking device (1) when receiving a plurality of modified transmissions (162) from a plurality of distinct receiving devices (100) identifying the same tracking device (1).

S11. The system according to any of the preceding system embodiments wherein the server (200) is further configured to send a map with all nearby tracking devices (1) to the receiving device (100).

S12. The system according to the preceding embodiment wherein the server (200) is further configured to provide further information associated with a particular tracking device (1) to the receiving device (100) upon request.

S13. The system according to any of the preceding system embodiments wherein the server (200) is configured to interpolate a path taken over a time interval by a specific tracking device (1) secured to an animal based on the modified transmissions (162) received from a plurality of the receiving devices (100).

S14. The system according to the preceding embodiment wherein the server (200) is further configured to interpolate the path over the time interval based on known parameters of the animal associated with the tracking device (1).

S15. The system according to any of the preceding system embodiments wherein the server (200) is configured to extrapolate a path taken over a time interval by a specific tracking device (1) secured to an animal based on the modified transmissions (162) received from a plurality of the receiving devices (100).

S16. The system according to the preceding embodiment wherein the server (200) is further configured to extrapolate the path over the time interval based on known parameters of the animal associated with the tracking device (1).

S17. The system according to any of the preceding system embodiments wherein analyzing animal positions by the server comprises at least one of tracking animals over time; determining animal state based on recent movements; determining animal habits; interpolating animal location based on available data; and extrapolating animal movements based on available data.

S18. The system according to any of the preceding system embodiments wherein each tracking device (1) is assigned an access level and wherein the server (200) is configured to grant each receiving device (100) access to data associated with a given tracking device (1) only if the receiving device (100) is authorized for the access level of the given tracking device (1).

S19. The system according to any of the preceding system embodiments further comprising a first set of tracking devices (1) associated with a first type of animal and a second set of tracking devices (1) associated with a second type of animal and wherein each receiving device (100) is configured to detect transmissions (62) from both the first set of tracking devices and the second type of tracking devices and communicate the modified transmissions (162) to the server (200); and the server (200) is configured to process the modified transmissions (162) and assign data associated with the first and second sets of tracking devices (1) to separate submodules and log and analyze positions of the two type of animals separately.

S20. The system according to the preceding embodiment wherein the first and second sets of animals comprise at least one of wild animals;

cattle; and pets.

Below is a list of method embodiments. Those will be indicated with a letter "M". Whenever such embodiments are referred to, this will be done by referring to "M" embodiments.

M1. A method for tracking animals, the method comprising securing a tracking device (1) comprising a tracker processing component (2), an energy component (4), a transmitting component (6), and a securing component (8) to an animal; and the tracking device (1) periodically transmitting a transmission (62) comprising at least an identification corresponding to the animal via the transmitting component (6); and a receiving device (100) comprising a receiver processing component (102), a receiving communication component (104) and a receiver server communication component (106) receiving the transmission (62) from the tracking device (1) when the receiving device is in range of the tracking device's transmission (62); and the receiving device (100) modifying the transmission (62) by adding further data to it to obtain a modified transmission (162); and the receiving device (100) using the receiver server communication component (106) to communicate the modified transmission (162) to the server (200); and the server (200) logging and analyzing animal positions based on communications from a plurality of the receiving devices (100).

M2. The method according to the preceding embodiment further comprising the server (200) generating a map of animals corresponding to the tracking devices (1, 10, 12, 14, 16, 18).

M3. The method according to the preceding embodiment further comprising the server (200) communicating further data associated with the particular tracking device (1) to the receiving device (100); and the server (200) providing the generated map of animals to the receiving device (100).

M4. The method according to any of the preceding method embodiments further comprising the securing component (8) releasing after at least a certain predetermined time in use, so that the tracking device (1) is no longer secured to the animal.

M5. The method according to any of the preceding method embodiments further comprising the receiving device (100) adding location data associated with it to the transmission (62).

M6. The method according to the preceding embodiment further comprising the server (200) generating a location map of a plurality of tracking devices (1) secured to the animals.

M7. The method according to any of the two preceding embodiments further comprising the server (200) generating a time-dependent location map of the tracking devices (1) secured to the animals.

M8. The method according to any of the preceding method embodiments further comprising the server (200) sending a map with all nearby tracking devices (1) to the receiving device (100).

M9. The method according to any of the preceding method embodiments further comprising
- the server (200) receiving a plurality of modified transmissions (162) from a plurality of distinct receiving devices (100) relating to the same tracking device (1); and
- the server (200) triangulating the location of the tracking device (1) based on the plurality of the modified transmissions (162).

M10. The method according to any of the preceding method embodiments wherein the tracking device (1) further comprises a sensor (30) and wherein the method further comprises the tracking device (1) adding sensor data to the transmission (62) and the server (200) using sensor data to determine status of the animal.

M11. The method according to any of the preceding method embodiments further comprising the tracker processing component (2) adjusting rate of sending out transmissions (62) based on amount of energy available to the energy component (4) at a given time.

M12. The method according to any of the preceding method embodiments further comprising the server (200) interpolating a path taken by the tracking device (1) secured to an animal over a time period based on the modified transmissions (162) and further known parameters associated with the animal.

M13. The method according to any of the preceding method embodiments further comprising the server (200) extrapolating a path taken by the tracking device (1) secured to an animal over a time period based on the modified transmissions (162) and further known parameters associated with the animal.

M14. The method according to any of the preceding method embodiments wherein analyzing animal positions by the server comprises at least one of tracking animals over time;
- determining animal state based on recent movements;
- determining animal habits;
- interpolating animal location based on available data; and
- extrapolating animal movements based on available data.

M15. The method according to any of the preceding method embodiments further comprising assigning an access level to each tracking device (1); and
- the server (200) granting each receiving device (100) access to data associated with a given tracking device (1) only if the receiving device (100) is authorized for the access level of the given tracking device (1).

M16. The method according to any of the preceding method embodiments further comprising
- providing a first set of tracking devices (1) associated with a first type of animal and a second set of tracking devices (1) associated with a second type of animal; and
- each receiving device (100) detecting transmissions (62) from both the first set of tracking devices and the second type of tracking devices and communicating resulting modified transmissions (162) to the server (200); and
- the server (200) processing the modified transmissions (162) and assigning data associated with the first and second sets of tracking devices (1) to separate submodules to log and analyze positions of the two type of animals separately.

Below is a list of use embodiments. Those will be indicated with a letter "U". Whenever such embodiments are referred to, this will be done by referring to "U" embodiments.

U1. Use of any of the preceding tracking device embodiments, tracking system embodiments and tracking method embodiments for tracking birds, preferably wild birds.

U2. Use of any of the preceding tracking device embodiments, tracking system embodiments and tracking method embodiments for tracking pets, preferably cats.

The present technology will now be discussed with reference to the accompanying drawings.

DESCRIPTION OF EMBODIMENTS

Figure 1:
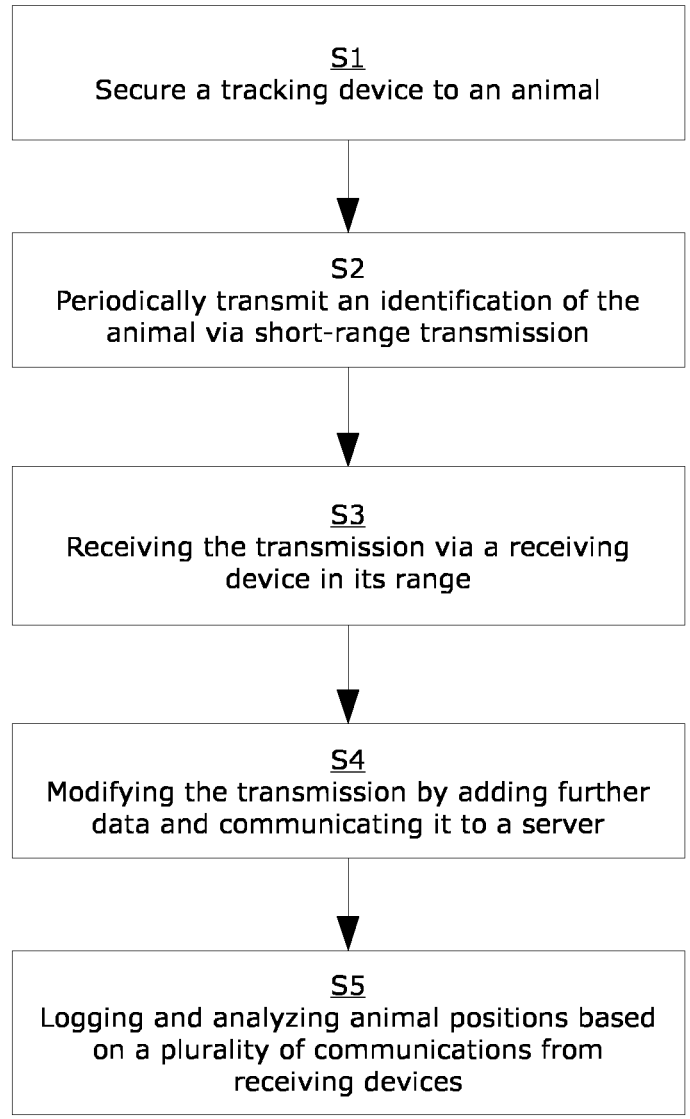
FIG. 1 depicts an embodiment of a method for animal tracking according to one aspect of the invention.

FIG. 1 depicts an embodiment of a method for animal tracking according to one aspect of the invention. The method can be used to track wild animals such as birds or mammals in the wild, track farm animals or track pets that venture outdoors. In a preferred embodiment, the method is used for tracking wild animals.

In step S1, a tracking device is secured to an animal. That is, the tracking device can be removably attached to an animal such as a bird or a mammal. The tracking device is further detailed below with reference to FIG. 2.

The tracking device can then periodically transmit an identification of the animal via short-range transmission in step S2. The transmission can be sent via the Bluetooth® protocol. The transmission can simply comprise an identification number associated with the animal that the tracker is secured to. In this way, very little data needs to be sent, and the required energy can be minimized. The transmission can be sent at regular intervals for as long as the tracking device is powered. For example, the transmission can be sent every second or every minute.

In step S3, the transmission is received via a receiving device in its range. The receiving device can comprise, for example, a personal computing device such as a mobile phone or a smartphone, a tablet, a wearable device or similar. The range generally depends on both the tracking device and the receiving device. It can be on the order of 0 to 100 meters, but more preferably is up to at least 1000 meters. That is, the maximum distance between the tracking device and the receiving device at which the receiving device still receives the transmission can be about 1 kilometer.

The transmission is modified by adding further data in step S4, followed by communicating it to a server. In other words, the receiving device modifies the transmission from the tracking device by adding further information to it. For example, such information can comprise the location of the receiving device and time. The receiving device then forwards this modified transmission (including the additional data) to a server. The communication between the receiving device and the server is preferably done via a different transmission protocol than the one via which the tracking device transmits. For example, the receiving device can comprise a smartphone that uses standard cellular protocols to communicate with the server.

In step S5, the server generates a map of animals based on a plurality of communications from a plurality of receiving devices. That is, the server piecewise combines all of the different data related to the tracking devices secured to different animals to obtain a map of those animals. The map can be a location map based on the location of the receiving devices at the time of receiving transmissions from tracking devices. The map can also be a time-based location map showing the movements of each of the tracking devices (potentially based on transmissions received by different receiving devices at different times and locations). The generated map can then be shared with the receiving devices in communication with the server. Further information can also be requested by the communication devices from the server. For example, information regarding the animal that a particular tracking device is affixed to could be requested.

The method will now be explained in a concrete example with reference to tracking birds. A skilled person will recognize, that this is exemplary and does not limit the invention to bird tracking, as it is applicable to track different animals.

In this preferred embodiment, the tracking device comprises a very small and light chip capable of transmitting in the short range, preferably via the Bluetooth®® protocol or similar. This allows the tracking device to reach personal computing devices such as smartphones, since they generally have the capabilities for Bluetooth®® out of the box. Other communication protocols that are standard on modern smartphones, tablets and/or wearable devices can be used as well. The tracking device can be made particularly light and small by deliberately omitting a battery. The present tracking device can be fitted with capacitors for very limited energy storage sufficient to transmit data over low-energy short-range wavelengths, but not for much else. A solar cell, a kinetic energy cell, a thermal cell or similar energy converters can be used to power the device. The tracking device can be encased in a housing, which, in its simplest form, can comprise varnish applied to the chip directly. The device can be further outfitted with something to secure it to birds. In a simplest case, it can be a harness, which can be fitted around the birds' legs. Different securing elements can be used for different animals.

Once the tracking device is secured to a bird, it can be released back into the wild. Tracking of the bird is then done passively as follows. The tracking device periodically emits a transmission communicating its ID (this allows to minimize the transmission and the energy needed for it). In some embodiments, the tracking device can also emit current sensor readings such as temperature, humidity or detected acceleration. The transmission can be detectable by devices configured for the standard protocol used by the tracker in a certain range. The range is preferably about 1 kilometer. Interested users would download a companion app on their smartphone, tablet, wearable device or a similar personal computing device. The app would ensure that the transmission is not ignored by the device (like most transmissions that the device is capable of detecting, but does not need to interact with), but received by it. The app then instructs the receiving device to add some data to the transmission to get the modified transmission (preferably at least time and location data). Following this, the app transmits the modified transmission to a remote server, preferably via cellular protocols. In this way, the server obtains the location and time of the receiving device at the time of it detecting the transmission from the tracking device. Advantageously, this is done without the tracking device having to transmit all of this information and thereby requiring a memory, a GPS or similar component and a battery.

For the users of the companion app, the appeal lies in the possibility to track animals such as birds and to finds them in the wild more effectively. Note, that this similarly applies to the case of tracking pets in an urban environment: the appeal for the users is to be able to follow the movements of their pet outdoors and to find it should the need arise. For farming applications, the owners of the animals generally know the area where the animals should be, so they can use the companion app while doing the rounds to account for all of the animals in their vicinity, or even track them via drones or other autonomous robots that can circulate in the area and thereby report the approximate locations of the animals.

Going back to the present exemplary embodiment of bird tracking, the server logs and analyzes animal positions based on all of the modified transmissions received from all of the receiving devices. The server can output this information in the form of a map with all of the animals shown on it. The map can have locations of all of the detected birds with the time of detection. The map can also be a time-based map showing the time-dependent locations of the birds and the trajectories they likely took.

The map can be shared with the receiving devices via the app. The users of the app can also request information regarding a particular bird on the map, for example a photo, its species, age, habits or other information. This can be very interesting for people that enjoy observing animals. Furthermore, the companion app can add a game-like experience for the users. For example, people that normally don't specifically go bird watching can still use the app when out hiking or walking in nature to get a better understanding of the animals in their surroundings.

The server can also localize birds more precisely when more receiving a plurality of modified transmissions from a plurality of smartphones, originating from the same transmission from the same tracking device. That is, the server can triangulate the location of the animal when receiving multiple modified transmissions about it. This is further detailed below with reference to FIG. 8.

The present infrastructure can also be used to track different sets of animals simultaneously. For example, a first set of tracking devices can be placed on a first type of animals, and a second set of tracking devices can be placed on a second type of animals. The first set of animals can comprise, for example, wild birds. The second set of animals can comprise outdoor venturing pets. There can be further sets of animals which can comprise cattle, free ranging cattle, and/or different types of wild animals.

The tracking devices can be the same for all sets of animals or can be optimized depending on the application. For example, a battery can be used in some tracking devices, but not in others. A battery can be useful to allow for continuous tracking of animals, as in the case of solar energy harvesters, the tracker would only work in sufficient light conditions. On the other hand, a battery can add additional weight to the tracking device, which can be cumbersome for smaller animals such as birds. In light of this, different versions of the tracking device can be manufactured for different types of animals.

However, besides the additional features such as a battery (and possibly further sensors), the tracking devices would have the same functionality, and therefore use the same communication infrastructure. That is, a given receiving device would be able to receive transmissions from both (or all of) sets of tracking devices associated with different types of animals. Analogously, one server can be used to log and analyze data obtained from different sets of trackers. The server can have a plurality of submodules dealing with the plurality of different sets of data from the trackers.

Depending on the type of animal, the server can apply different processing and analysis procedures to the data from the different sets of trackers. For example, a time-dependent location map of bird movements could be useful for wild bird monitoring. On the other hand, for farmers looking for their cattle, a precise triangulation procedure would be beneficial. Pet owners, however, could be interested in various sensor readouts indicating the well-being of their pet (such as temperature sensors, accelerometers, heartrate sensors or others). Of course each and all of these analyses could be applied to each and all of the different types of animals.

Furthermore, different access levels can be associated with each tracker and/or each set of trackers associated with different animals. That is, some information regarding some tracking devices can be accessible only to receiving devices with the appropriate authorization. For example, specific information regarding cattle and/or a pet can be accessible only to the owner and/or a selected group of people. Conversely, information regarding wild animals can be accessible to any interested party, and therefore to all receiving devices. In this example, the access level associated with the trackers on wild animals would be low, or set to "public" (that is, access would be universal), and the access level associated with the trackers on pets or cattle would be high, or set to "private" (that is, access would be restricted). Of course, the owner would be able to modify the level of access as they desire.

Figure 2:
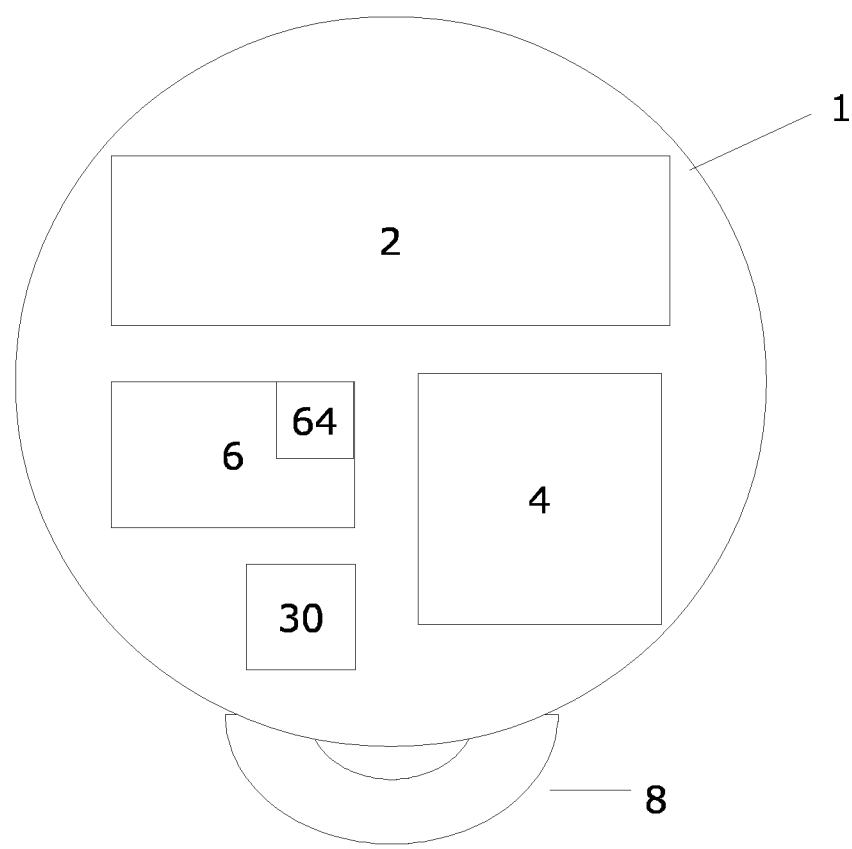
FIG. 2 depicts a schematic embodiment of a tracking device according to one aspect of the invention.

FIG. 2 schematically depicts an embodiment of the tracking device 1 according to an aspect of the invention. The tracking device 1 comprises a tracking processing component 2. The processing component 2 can comprise a Bluetooth® low energy microcontroller for example. The processing component 2 is configured to coordinate the workings of the tracker 1 and to ensure that it transmits as planned. Note, that the microcontroller can either be integrated with a chip providing Bluetooth® functionality (as shown in the figure). Alternatively, the Bluetooth® chip can be a separate component. The tracking device 1 further comprises an energy component 4. The energy component 4 can comprise a solar cell, a kinetic cell, a thermal cell or a similar compact energy converting device. The energy component 4 preferably does not comprise a battery, as this adds unnecessary weight and bulk to the tracker 1. The tracking device 1 also comprises a transmitting component 6. The transmitting component 6 preferably comprises an antenna configured to transmit in the radio frequency range. The transmitting component 6 is configured to periodically send out a transmission 62 (not pictured here).

The transmitting component 6 also preferably comprises an amplifier 64. The amplifier 64 serves to amplify the radio frequency signal sent out by the tracking device 1. For example, the amplifier can increase the maximum range of a transmission 62 from 200 m to 1000 m. For example, without the amplifier 64, power range of about 10 $\mu W$ to 3 mW would be accessible via the tracking device 1. With the amplifier 64, the accessible range comprises about 500 $\mu W$ to 100 mW. This increases the approximate maximum transmission 62 reach from about 30 m to about 1000 m. Note, that the present values reflect the BLE 4.2 protocol. With the implementation of Bluetooth 5, the range would be extendable to about 5-10 km, such as around 8 km.

The tracking device 1 also comprises a securing component 8. The securing component 8 serves to secure the tracker 1 to an animal. The securing component 8 can take different forms depending on the animal in question. For example, for birds, the securing component 8 can comprise a harness or "backpack" which can be secured around the legs. For pets, the securing component 8 can comprise a collar to which the tracking device 1 is attached. Similarly, a collar can be used for livestock or for larger mammals. The securing component 8 is preferably manufactured and secured in such a way that it releases after a certain minimum amount of time. That is, it can be preferable that the tracking device 1 eventually falls off from an animal. This is particularly useful for wild animals. Once the tracker's expected lifetime passes, it is advantageous that it falls and does not burden the animal anymore (however small the burden in the first place due to the small size and weight of the tracker 1). The timed release can be achieved, for example, with a specific type of glue used on the tracker and/or on the securing component 8. Such glue can dissolve after a certain amount of elements exposure or even time. Other methods can also be used to achieve a time-delayed release of the securing component 8.

The tracking device 1 can also comprise one or more sensors 30. The sensors 30 can comprise temperature, humidity, acceleration or other types of sensors. Such sensors 30 can advantageously provide information about the physical state of the animal, as well as its surroundings. For example, if the tracker 1 is secured close to the animal's skin, the temperature can indicate whether the animal is alive. The sensor's data can be received by the tracker processing component 2 and added to the transmission 62 (not shown here). However, the sensor 30 is optional, since operating it requires more energy and sending its data with the transmission 62 make it longer, similarly requiring larger energy expenditures.

Figure 3:
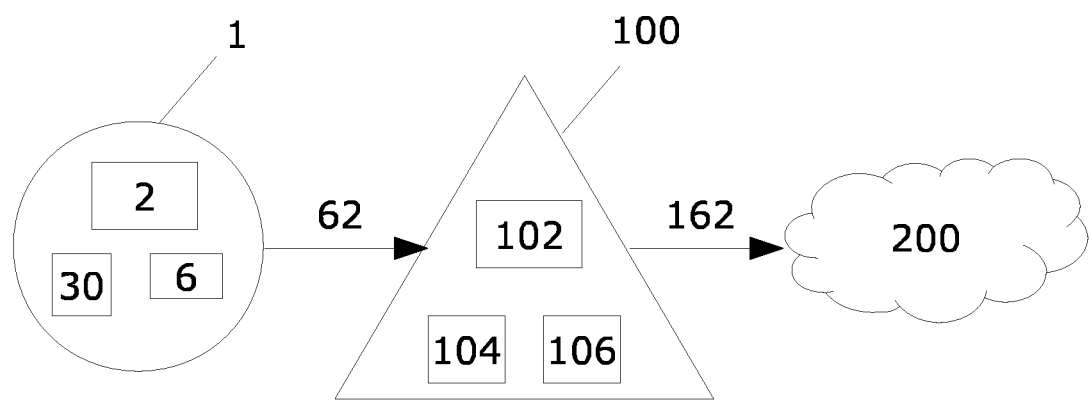
FIG. 3 schematically depicts a system for animal tracking comprising a tracking device, a receiving device and a server.

FIG. 3 schematically depicts a system for animal tracking. The system comprises the tracking component 1 that can be as described above and below. The tracker's transmitting component 6 periodically sends out a transmission 62 generated by the tracker processing component 2 and comprising an identification of the tracker 1 and optionally data from the sensor 30.

The transmission 62 is then picked up by a receiving device 100. The receiving device 100 preferably comprises a personal computing device such as a mobile phone, a smartphone, a tablet, a wearable device or a similar device. The receiving device 100 can belong to a user that installed a companion app on their device and is interested in receiving information related to animals in their surroundings.

The receiving device 100 comprises a receiver processing component 102, a receiver communication component 104 and a receiver server communication component 106. The receiver processing component 102 can comprise a standard system on a chip with a CPU, GPU and further components typically used in personal computing devices such as smartphones. The receiver communication component 104 can comprise an antenna configured to receive short-range communications from standard protocols, preferably Bluetooth® or similar protocols. The receiver server communication component 106 can comprise an antenna configured to communicate via cellular networks, such as GSM antenna. Generally, the receiver communication component 104 and the receiver server communication component 106 comprise two different antennas, but one antenna encompassing both protocols (that is, configured to send and receive in broadband encompassing both bandwidths) would also be possible.

The receiving device 100 picks up the transmission 62 only when it is in its range. This is preferably at least around a kilometer from the tracking device 1. Currently, Bluetooth® allows for a range on the order of about 100 meters. This, however, is about to be extended further. The receiving device 100 adds data to the transmission 62 to obtain a modified transmission 162. That is, the receiver processing component 102 adds further information to the transmission 62. This can comprise information regarding the location of the receiving device (that is, preferably, GPS coordinates) and time of reception of the transmission 62. Further parameters can also be added to the transmission 62. The receiving device 100 is configured to send the modified transmission 162 including the added data to a server 200. The server 200 can be a remote server, such as a cloud server for example.

Optionally the server 200 can also be configured to send data back to the receiving device 100. For example, a map of animals generated by the server based on the modified transmissions 162 can be sent back to the receiving device 100. Additionally, further information regarding a specific tracking device 1 and the corresponding animal it is secured to can be shared with the receiving device 100.

Figure 4:
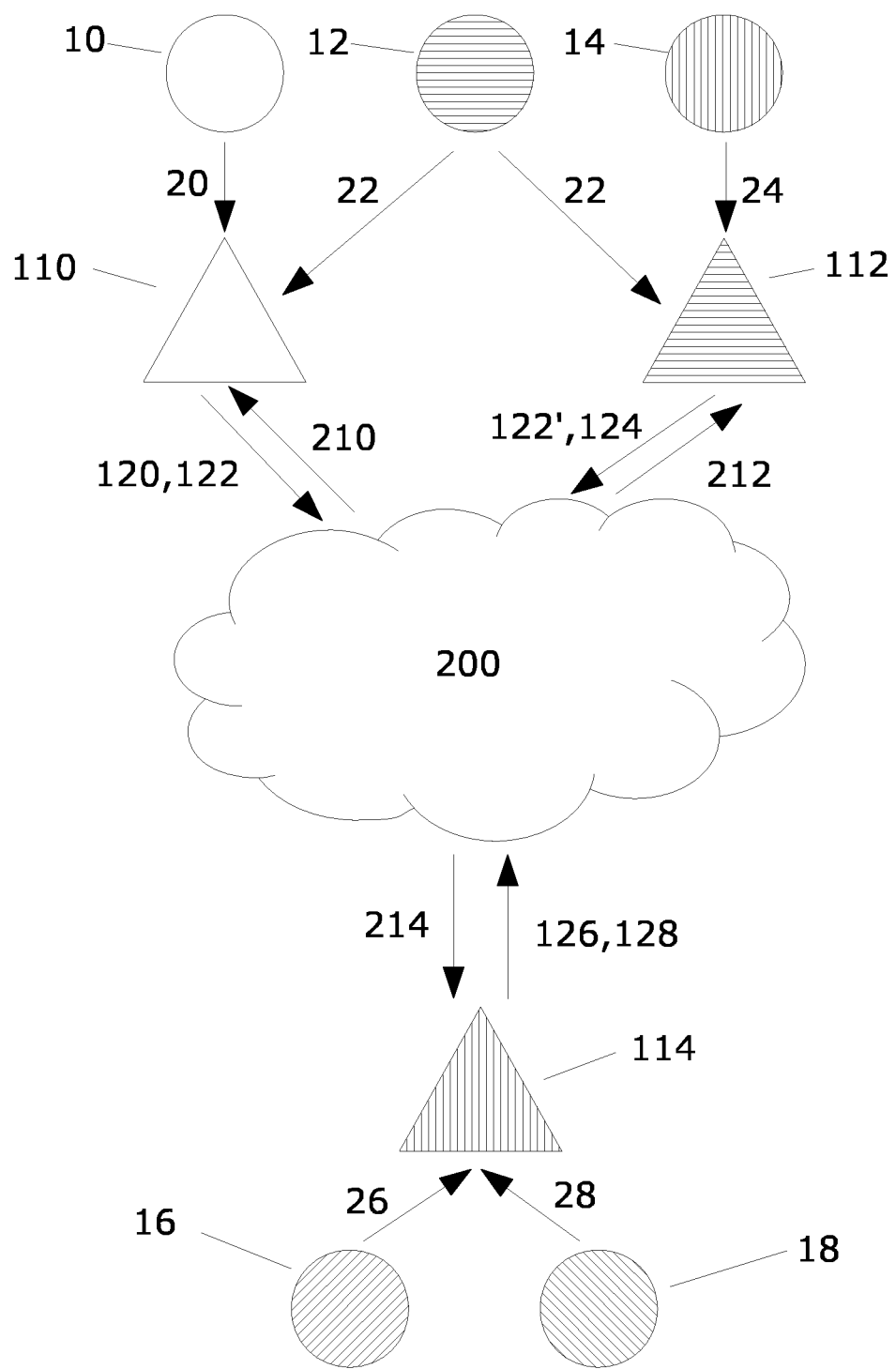
FIG. 4 depicts a system for animal tracking with a plurality of tracking devices and receiving devices.

FIG. 4 schematically illustrates communication in the animal tracking system. Multiple tracking devices 10, 12, 14, 16, 18 are depicted, as well as multiple receiving devices 110, 112, 114. First tracking device 10 is sending a first tracking transmission 20 to a first receiving device 110. Similarly, second tracking device 12 is sending a second tracking transmission 22 to the first receiving device 110. The first receiving device 110 adds further data to both transmissions 20, 22 and sends a first and second receiver transmissions to a server 200. Analogously, second and third tracking devices 12, 14 send out transmissions 22, 24 that are picked by the second receiving device 112. It modifies them and sends second and third receiver transmissions 122' and 124. Note, that second receiver transmissions 122 and 122' are not identical, since the data added by the first and second receiving devices 110, 112 is generally different (as they may be at different locations for example). Meanwhile, both fourth tracking device 16 and fifth tracking device 18 are sending out transmissions 26, 28 that are picked up by third receiving device 114. That is, the third receiving device 114 is simultaneously in the range of both fourth and fifth tracking transmissions 26, 28. The third receiving device 114 modifies them and forwards them to the server 200 as the fourth and fifth receiver transmissions 126, 128.

The server 200 generates a map of all tracking devices 10, 12, 14, 16, 18 using all of the transmissions sent by the receiving devices 110, 112, 114. The result is a patchwork map with the locations of different animals, preferably at different times. The server 200 can also optionally send different data back to the receiving devices 110, 112, 114. This is depicted by first, second and third server transmissions 210, 212, 214. These can be the same (for example, the server 200 can send the generated map with all of the animals to all of the receiving devices), or, they can be different depending on the queries of each of the receiving devices (for example, they may want additional information regarding the tracking device and the respective animal that they are detecting at the moment).

Figure 5:
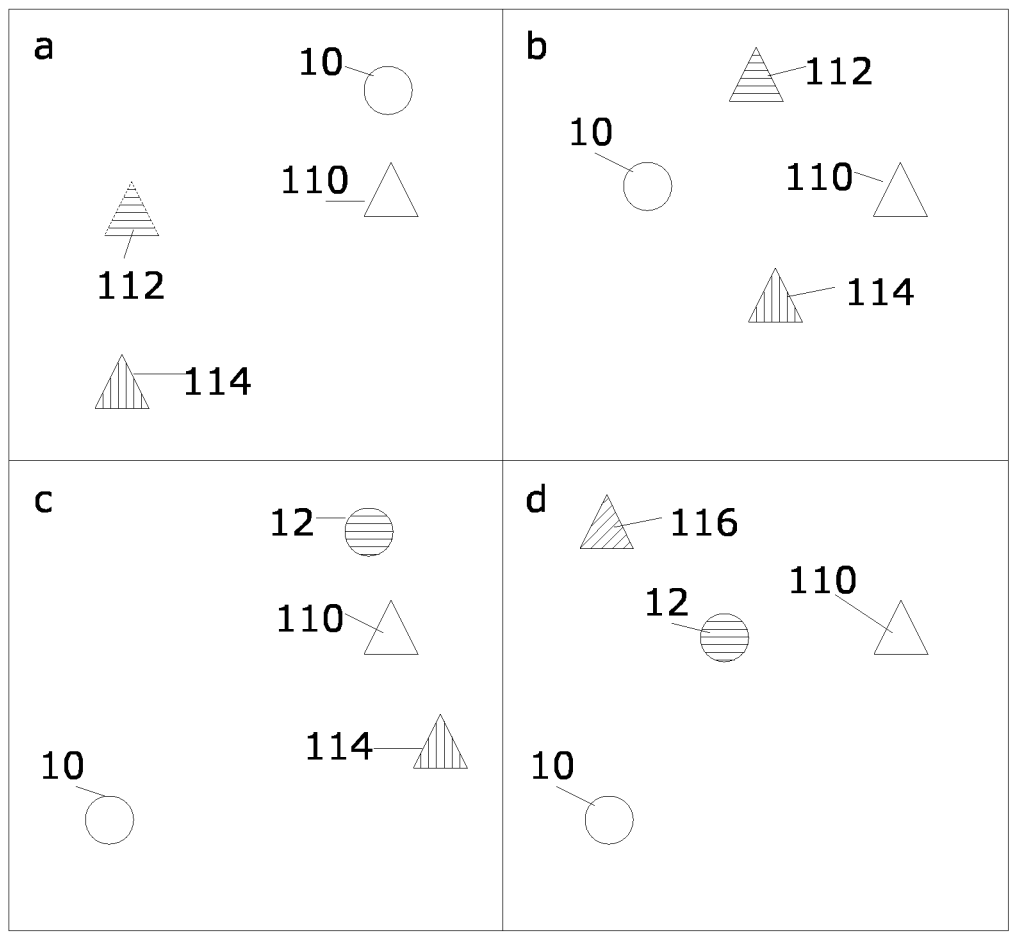
FIG. 5 depicts four sketches representing different points in time and a plurality of tracking devices and receiving devices moving from one point in time to the next.

FIG. 5 comprises four sketches a, b, c, d that schematically depict the movements of the tracking devices 10 and 12 and receiving devices 110, 112, 114, 116. That is, the sketches depict different snapshots in time. The figure represents a typical situation within a given area, for example a forest. The tracked animals are flying or moving around, and the users with the receiving devices are either stationary (for example, the user of the first receiving device 110) or moving about through the area.

Figure 6:
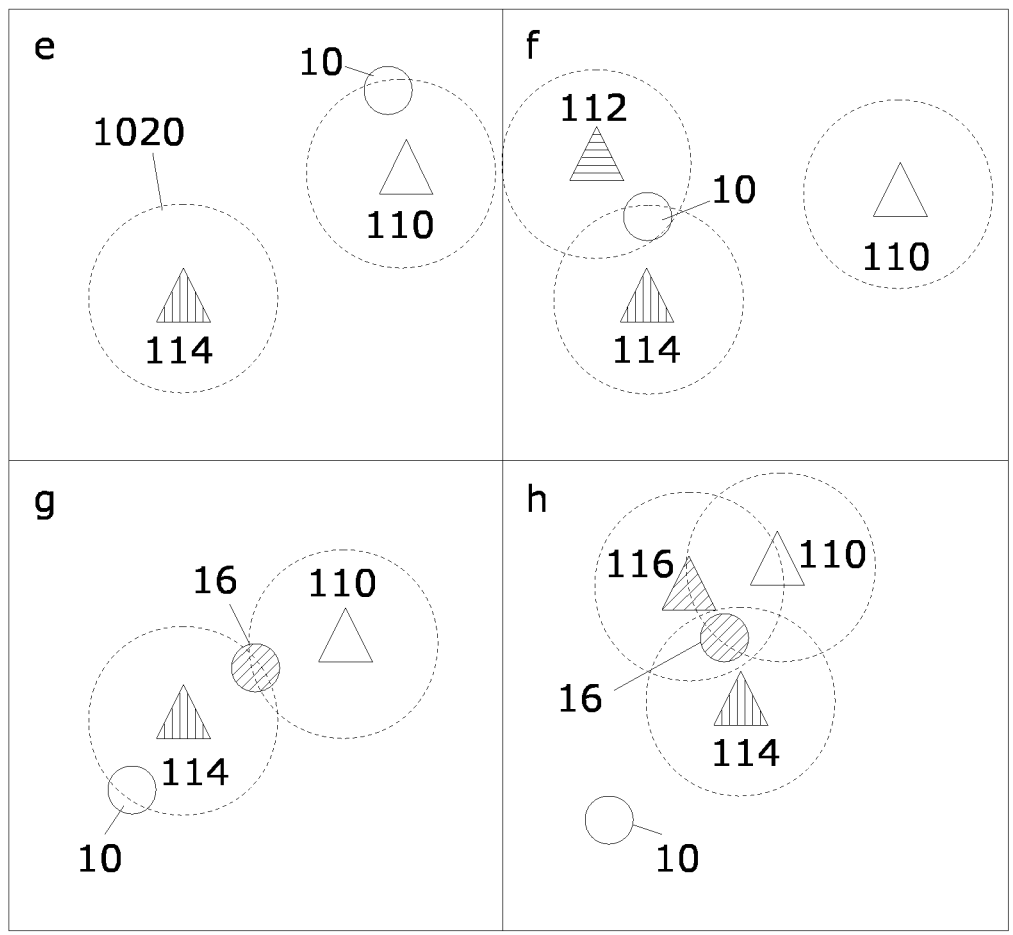
FIG. 6 similarly depicts four sketches taken at different points in time with a reception radius for each of the receiving devices.

FIG. 6 similarly has four sketches e, f, g, h representing snapshots in time of the tracking device and receiving devices moving around a certain area. Additionally, FIG. 6 depicts reception radii 1020 associated with each of the receiving devices 110, 112, 114, 116. The reception radius 1020 corresponds to the largest distance at which the receiving device still detects the transmission sent by the tracking device. The reception radii 1020 are depicted as having the same size, but this may not be the case. The reception radius 1020 may be dependent of the receiving device.

In sketch e, the first tracking device 10 is within the reception radius of the first receiving device 110. That is, the first receiving device 110 receives the transmission 62 (not shown) sent by the first tracking device 10. Conversely, the third receiving device 114 does not receive the transmission of the first tracking device 10, as it is too far.

Sketch f shows the first tracking device 10 in a different location. It is not within the reception radii of both second and third receiving devices 112, 114. Therefore, both 112 and 114 receive the transmission sent by the first tracking device 10. Furthermore, since both receiving devices detect the same tracking device, a more precise localization of the first tracking device 10 is possible. The server 200 (not shown here) can perform triangulation to obtain a better estimate of its location.

Sketch g shows the fourth tracking device 16 within the reception radii of the first and third receiving devices 110,

114. Furthermore, the third receiving device 114 also receives the transmission of the first tracking device 10. Therefore, the third receiving device 114 transmits both transmissions with the additional data to the server 200.

Sketch h shows the first tracking device 10 out of the reception radii of all present receiving devices 110, 114, 116. Therefore, its transmission is not received and no information regarding the first tracking device 10 is forwarded to the server 200 at the time of snapshot h. Conversely, the fourth tracking device 16 is in the receiving radii of the first, third and fourth receiving devices 110, 114 and 116. All three forward the transmission emitted by the fourth tracking device 16 to the server 200 along with the additional data (particularly that associated with the respective locations of the receiving devices). An even more precise triangulation of the fourth tracking device's position is possible in this case.

Figure 7:
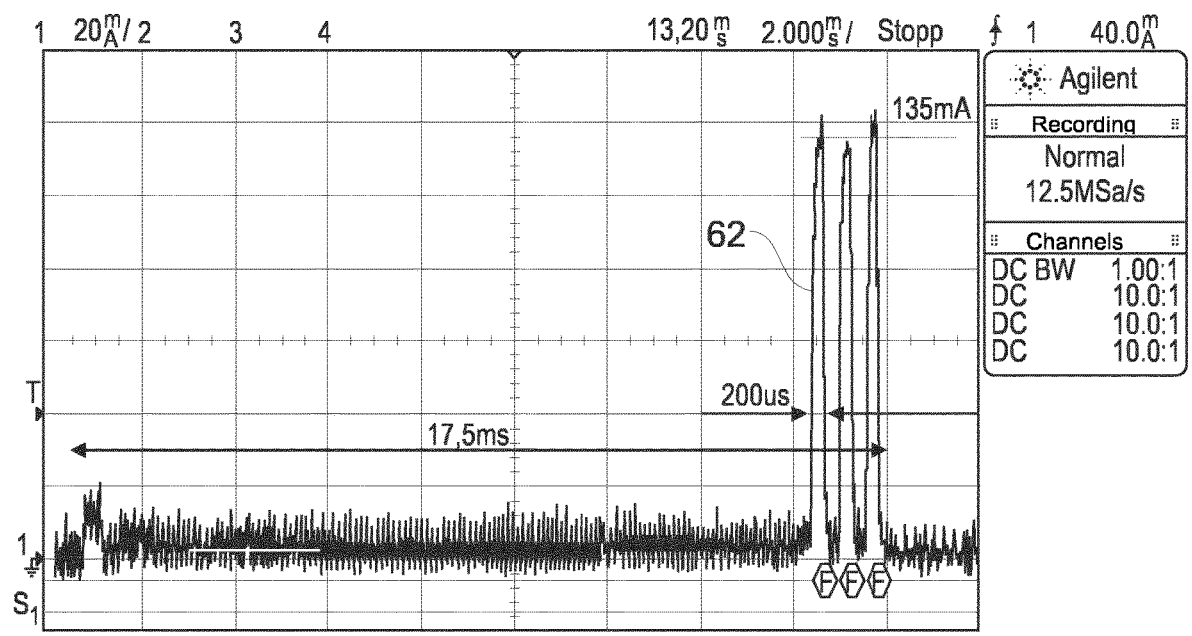
FIG. 7 depicts an exemplary transmission sent by the tracking device.

FIG. 7 depicts an exemplary transmission 62 that the tracking device 1 is configured to periodically transmit. The tracking device 1 can be programmed to deliver one short and very strong BLE (Bluetooth® Low Energy) pulse (or "beep"), carrying the animal's ID on startup in a very energy efficient way, as can be seen in the figure (showing how the tracking device 1 uses almost no power, except for the three peaks representing the BLE pulse). The tracking device 1 also preferably uses only the advertising part of the BLE protocol. That is, the tracking device 1 periodically sends out the transmission 62, but does not establish further communication with any devices that receive the transmission 62. FIG. 7 depicts the current consumption starting from the tracking device powering up (via the energy component, not shown here), until the end of the transmission 62. The transmission 62 comprises three peaks, which are sent with different frequencies corresponding to three BLE advertising channels.

The three peaks at about 135 mA show the transmission 62 with full power of about 100 mW. The total current consumption is about 136 µA as can be computed from the image as follows:

$$17.5\ ms \cdot 3\ mA + 3(200\ \mu s \cdot 135\ mA) = 136\ \mu As.$$

In an exemplary embodiment comprising a capacitor and an energy harvester (such as a solar cell of photodiodes) as part of the energy component, the harvesting chip can trigger the power up when the capacitor exceeds accumulated voltage of 5.2 V. In this exemplary embodiment, the capacitor comprises a 100 µF capacitance and discharges 1.36 V for powering the transmission 62. The remaining voltage is then about 3.84 V in the capacitor. The tracking device 1 can be powered down after sending the transmission 62 and the capacitor can be recharged via the energy harvesting chip.

Figure 8:
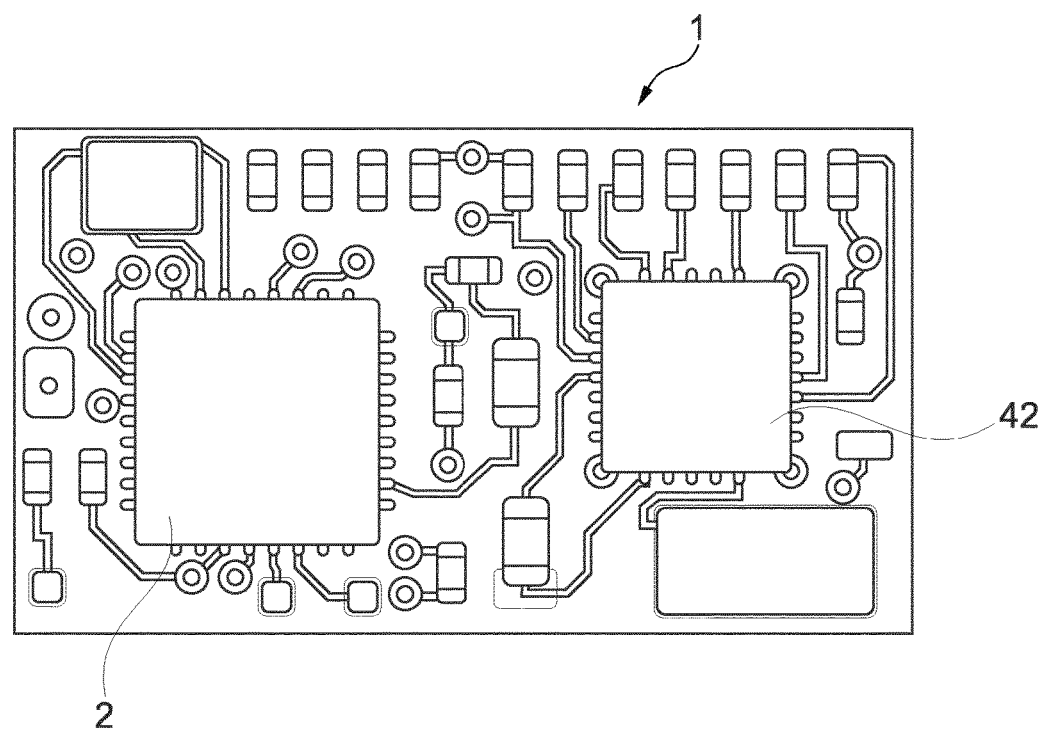
FIG. 8 depicts an exemplary actual embodiment of the tracking device according to the invention.

FIG. 8 depicts an actual exemplary depiction of the tracking device 1. A particular advantage of the present device is that it is much smaller and lighter than currently available comparable animal tracking means. The depicted device has the dimensions 8×14×2 mm and weights only about 0.5 g. The weight of the device can be further reduced to about 0.3 g.

An addition of a battery would increase the weight by about 0.33 grams. As discussed above, the battery can be beneficial for allowing continuous tracking, particularly during the night (when the preferred solar-based energy harvester would likely not provide sufficient power to the device). The capacitor serving as an energy storage component in the present device could be exchanged with a battery that would be charged by the harvester. The addition of a battery would also allow of a real-time clock on the tracking device 1. The clock, in turn, would allow for an implementation of an end of life condition, as well as logging data. For example, sensor data from temperature, acceleration and other sensors could be logged. This data could then be sent together with the transmission 62. Alternatively, the data could be saved on the tracker and be accessed when the tracker is recaptured (either with or without the animal). Note, that the tracking device 1 can be easily located with a directional antenna like simple telemetry transmitters. No further hardware changes besides exchanging the capacitor for the battery would be necessary to implement these functions on the depicted device (potentially also the addition of further sensors).

In the depicted figure, the processing component 2 is shown. The processing component can be a microcontroller with an inbuilt Bluetooth module (as shown in the figure). Alternatively, the Bluetooth module can comprise a separate chip connected to the microcontroller. Also shown is an energy harvester controller 42. The energy harvester controller can be configured to control the rate of energy acquisition, for example via photo diodes or solar cells.

Figure 9:
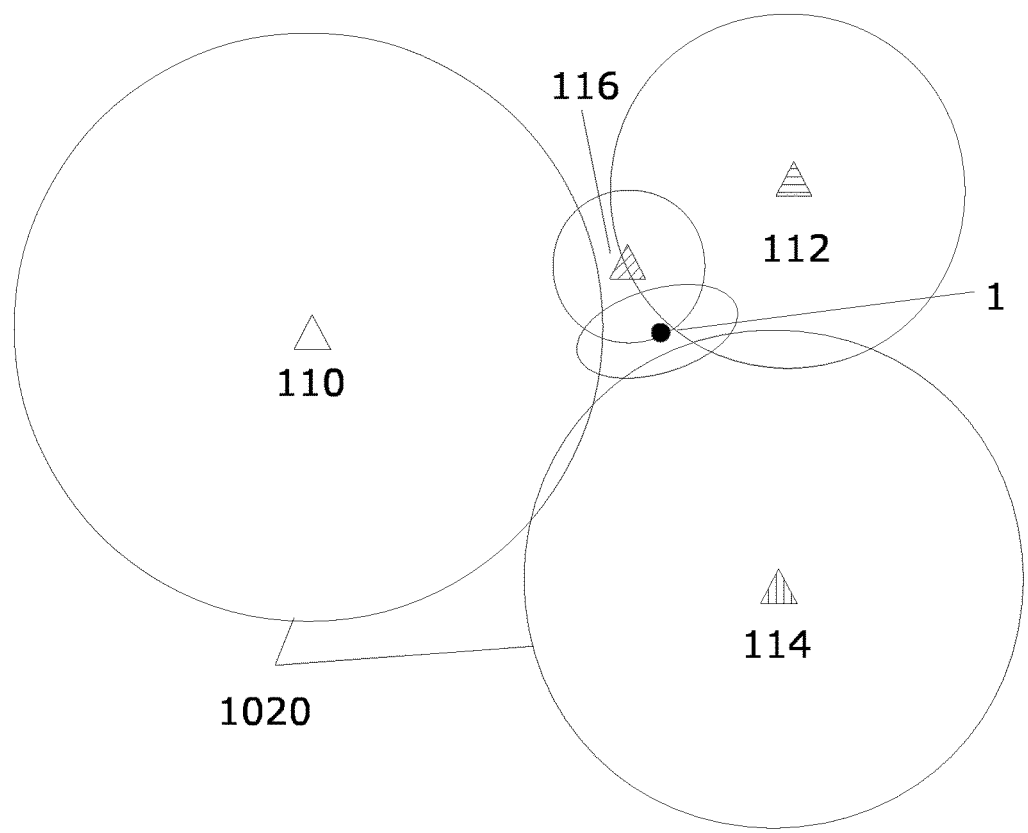
FIG. 9 depicts an exemplary triangulation procedure for a tracking device with the use of a plurality of receiving devices.

FIG. 9 depicts an exemplary detection precision enhancement process for the triangulation of a tracking device. A tracking device 1 is shown, as well as a plurality of receiving devices 110, 112, 114, 116. Each of the receiving devices is shown with the reception radius 1020. The reception radii 1020 can vary in length, due to the specifications of each of the receiving devices 110, 112, 114, 116. By placing the receiving devices 110, 112, 114, 116 at different locations, it is possible to narrow down the precise position of the tracking device 1, and therefore of the animal that it is secured to (up to a certain error indicated by the ellipse).

Prerequisites for the Process a) A secure online server with a database containing animal ID's together with relevant metadata on the animals to be located.

b) The server (a) running several background processes that can be triggered by changes to the database.

c) Animals that have been fitted with the described Bluetooth® transmitter.

d) Bluetooth® enabled mobile phone(s)

e) An app running on (d) able to detect (c) through a background service, and communicate this data wirelessly to (a)

Process to Enhance Detection Precision

1) An animal (c) with a Bluetooth® transmitter (c) enters the Bluetooth® range of a mobile phone (d)

2) The mobile phone (d) discovers the transmitter (c).

3) The mobile phone (d) has no need to connect to the Bluetooth® transmitter, as it already receives an encrypted ID at the time of discovery. This is possible by inserting the encrypted id as a Company Identifier Code, part of the Bluetooth® BLE specification's Manufacturer Specific Data type.

4) The ID of the bird, time of registration, and GPS coordinates of the phone at time of the detection are gathered and saved locally by the app (e) and are then sent to central server (a) over an SSL (Secure Sockets Layer) connection.

5) If the ID received by the server (a), on decryption by one of the server's background processes (b) conforms to some basic checksums, the server inserts the ID of the bird, the time of registration, and the GPS coordinates into the secure database (a)

6) Another server process on (b) is triggered by this insert. This process checks whether there have been other detections within a predefined period of time, during which an animal (c) with a specific ID can reasonably be expected to stay within reach of several mobile phones (d).

7) When at least two mobile phones (d) detect an animal with a transmitter (c) within the predetermined period of time, a more precise location of the animal (c) can be calculated. When at least three mobile phones connect, this more precise location is calculated by making use of the concept of trilateration.

8) This enriched position information can then be sent back to the detecting mobile phones (d), again over an SSL (Secure Sockets Layer) connection. This enables the mobile phone's users to localize an animal with enhanced precision through the app (e).

The location precision process can be used as a game by a group of friends for example.

Figure 10:
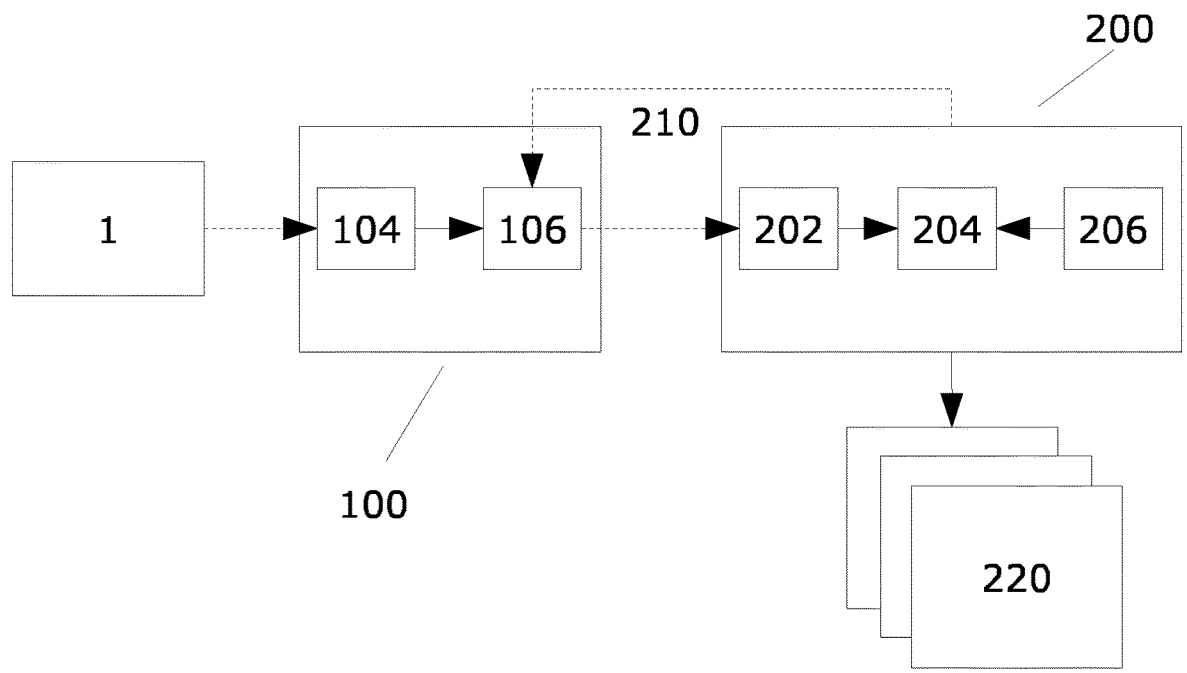
FIG. 10 depicts an embodiment of communication architecture of a system for animal tracking.

FIG. 10 depicts an embodiment of communication architecture in the animal tracking system. Note, that for clarity, communications within one component of the system are shown with a solid line, while those between the components are shown with dashed lines in FIG. 10.

The tracking device 1 secured to an animal sends a transmission that is picked up by the receiving device 100. More precisely, the transmission is received by the receiver communication component 104. The transmission is then processed and expanded before being handed over to the receiver server communication component 106. From there, the modified transmission is sent to the server 200. There, it is picked up by the server data module 202, which processes and sorts incoming data. On the server 200, the received data is then stored in the server database 204. Multiple server databases 204 can also be present, for example to separate data relating to different sets of trackers corresponding to different animals. Server processing module 206 accesses the data stored in the server database 204 in order to perform different operations with it. For example, the server processing module 206 can triangulate a specific tracking device 1, extrapolate missing data, compute animal habits based on all of the available data or perform other operations. The server 200 can yield server outputs 220. Server outputs 220 can comprise different forms. For example, a historical or real time map of specific animals can be generated based on the set of trackers secured to them. Various other graphical or textual representations of the data can also be comprised in the server outputs 220.

The server outputs 220 can also reflect different access levels associated with the different tracking devices 1. For example, the outputted map of animals can include only tracking devices 1 with "public" access level. Another type of server output 220 that can be generated by the server 200 can be an alert to be sent to a specific receiving device 100. This can be useful for pet owners that can be interested in setting up a specific radius around their residence and receiving an alert when their pet ventures outside of this radius. Further server outputs 220 are also possible. The server can also return some of the outputs to the receiving device 100 via server transmission 210.

LIST OF REFERENCE NUMERALS

1—Tracking device
2—Tracker processing component
4—Energy component
6—Transmitting component
8—Securing component
10—First tracking device
12—Second tracking device
14—Third tracking device
16—Fourth tracking device
18—Fifth tracking device
20—First tracking transmission
22—Second tracking transmission
24—Third tracking transmission
26—Fourth tracking transmission
28—Fifth tracking transmission
30—Sensor
42—Energy harvesting controller
62—Tracking device transmission
64—Transmission amplifier
100—Receiving device
102—Receiver processing component
104—Receiver communication component
106—Receiver server communication component
110—First receiving device
112—Second receiving device
114—Third receiving device
116—Fourth receiving device
120—First receiver transmission
122—Second receiver transmission
124—Third receiver transmission
126—Fourth receiver transmission
128—Fifth receiver transmission
162—Modified transmission
200—Server
202—Server data module
204—Server database
206—Server processing module
210—First server transmission
212—Second server transmission
214—Third server transmission
220—Server output
1020—Reception radius Whenever a relative term, such as "about", "substantially" or "approximately" is used in this specification, such a term should also be construed to also include the exact term. That is, e.g., "substantially straight" should be construed to also include "(exactly) straight".

Whenever steps were recited in the above or also in the appended claims, it should be noted that the order in which the steps are recited in this text may be the preferred order, but it may not be mandatory to carry out the steps in the recited order. That is, unless otherwise specified or unless clear to the skilled person, the order in which steps are recited may not be mandatory. That is, when the present document states, e.g., that a method comprises steps (A) and (B), this does not necessarily mean that step (A) precedes step (B), but it is also possible that step (A) is performed (at least partly) simultaneously with step (B) or that step (B) precedes step (A). Furthermore, when a step (X) is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

The invention claimed is:

1. A tracking device for animals, the device comprising
a tracker processing component; and
an energy component; and
a transmitting component configured to periodically transmit a transmission comprising at least an identification corresponding to the animal; and
a securing component configured to secure the device to animals;
wherein the transmitting component is configured for short-range transmissions and to operate via a BLU- ETOOTH® low energy (BLE) protocol and wherein the tracking device is further configured to use only an advertising part of the BLE protocol;

wherein the tracking device does not establish further communication with any devices that receive the transmission;

wherein no connection is established between the tracking device and a receiving device;

wherein the identification corresponding to the animal is encrypted; and wherein the encrypted information corresponding to the animal is received as a Company Identifier Code as part of the BLUETOOTH® low energy (BLE) specification's Manufacturer Specific Data Type.

2. The tracking device according to claim 1 wherein the maximum weight of the device comprises the lowest between at most 5% of the weight of the animal it is configured to track; and 5 grams.

3. The tracking device according to claim 1 wherein the securing device is configured to release after at least a certain predetermined time in use, so that the tracking device is no longer secured to the animal.

4. The tracking device according to claim 1 wherein the tracker processing component is configured to adjust rate of transmitting the transmission based on energy input to the energy component and wherein the processing component is configured to decrease the rate of sending the transmission to at most 1 per 40 seconds when the energy input of the energy component comprises at most 4000 lux; and increase the rate of sending the transmission to at least 1 per second when the energy input of the energy component comprises at least 30 000 lux; and adjust the rate of sending the transmission proportionally when the energy input of the energy component is between 4000 and 30 000 lux.

5. A system for tracking animals, the system comprising a plurality of tracking devices, each comprising
   a tracker processing component; and
   an energy component; and
   a transmitting component configured to periodically transmit a transmission comprising at least an identification corresponding to the animal; and
   a securing component configured to secure one tracking device to an animal;
   wherein the transmitting component is configured for short-range transmissions and to operate via a BLUETOOTH® low energy (BLE) protocol and wherein the tracking device is further configured to use only an advertising part of the BLE protocol;
a plurality of receiving devices; each comprising
   a receiver processing component; and
   a receiving communication component configured to detect transmissions from the tracking device when in range; and
   a receiver server communication component;
a server configured to log and analyze animal positions based on the communications from the receiving devices;
wherein the receiver processing component is configured to add further data to the transmission to obtain a modified transmission;
wherein the receiver server communication component is configured to communicate the modified transmission to the server, wherein the tracking device does not establish further communication with any devices that receive the transmission, wherein no connection is established between the tracking device and the receiving devices, and wherein the identification corresponding to the animal is encrypted, and wherein the encrypted ID is received as a Company Identifier Code, as part of the BLUETOOTH® BLE specification's Manufacturer Specific Data type.

6. The system according to claim 5 wherein the receiver processing component is configured to add data associated with the receiving device to the transmission and wherein the data associated with the receiving device comprises at least location of the receiving device.

7. The system according to claim 6 wherein the server is configured to combine each location received from each receiving device for each tracking device to obtain a time-dependent position corresponding to the animal to which each tracking device is secured and wherein the server is further configured to create a time-dependent location map for each tracking device.

8. The system according to claim 5 wherein the server is further configured to triangulate location of the tracking device when receiving a plurality of modified transmissions from a plurality of distinct receiving devices identifying the same tracking device.

9. The system according to claim 5 wherein the server is configured to at least one of interpolate and extrapolate a path taken over a time interval by a specific tracking device secured to an animal based on the modified transmissions received from a plurality of the receiving devices and wherein the server is further configured to respectively at least one of interpolate and extrapolate the path over the time interval based on known parameters of the animal associated with the tracking device.

10. The system according to claim 5 wherein each tracking device is assigned an access level and wherein the server is configured to grant each receiving device access to data associated with a given tracking device only if the receiving device is authorized for the access level of the given tracking device.

11. The system according to claim 5 further comprising a first set of tracking devices associated with a first type of animal and a second set of tracking devices associated with a second type of animal and wherein
   each receiving device is configured to detect transmissions from both the first set of tracking devices and the second type of tracking devices and communicate the modified transmissions to the server; and
   the server is configured to process the modified transmissions and assign data associated with the first and second sets of tracking devices to separate submodules and log and analyze positions of the two types of animals separately.

12. A method for tracking animals, the method comprising securing a tracking device comprising a tracker processing component, an energy component, a transmitting component, and a securing component to an animal; and
   the tracking device periodically transmitting a transmission comprising at least an identification corresponding to the animal via the transmitting component which operates via a BLUETOOTH® low energy (BLE) protocol and wherein the tracking device is further configured to use only an advertising part of the BLE protocol; and a receiving device comprising a receiver processing component, a receiving communication component and a receiver server communication component receiving the transmission from the tracking device when the receiving device is in range of the tracking device's transmission; and the receiving device modifying the transmission by adding further data to it to obtain a modified transmission;

the receiving device using the receiver server communication component to communicate the modified transmission to the server; and the server logging and analyzing animal positions based on communications from a plurality of the receiving devices, wherein the tracking device does not establish further communication with any devices that receive the transmission, wherein no connection is established between the tracking device and the receiving devices, and wherein the identification corresponding to the animal is encrypted, and wherein the encrypted ID is received as a Company Identifier Code, as part of the BLUETOOTH® Low Energy (BLE) specification's Manufacturer Specific Data type.

13. The method according to claim 12 wherein the tracking device further comprises a sensor and wherein the method further comprises the tracking device adding sensor data to the transmission and the server using sensor data to determine status of the animal.

14. The method according to claim 12 wherein analyzing animal positions by the server comprises at least one of
tracking animals over time;
determining animal state based on recent movements;
determining animal habits;
interpolating animal location based on available data; and
extrapolating animal movements based on available data.

15. The method according to claim 12 further comprising further comprising the server generating a map of animals corresponding to the tracking devices.

16. The method according to claim 12 further comprising the receiving device adding location data associated with the tracking device to the transmission.

17. The method according to claim 12 further comprising
the server receiving a plurality of modified transmissions from a plurality of distinct receiving devices relating to the same tracking device; and
the server triangulating the location of the tracking device based on the plurality of the modified transmissions.

18. The method according to claim 12 further comprising assigning an access level to each tracking device; and
the server granting each receiving device access to data associated with a given tracking device only if the receiving device is authorized for the access level of the given tracking device.

* * * * *